United States Patent [19]

Brollo

[11] 4,350,374
[45] Sep. 21, 1982

[54] HEADER FOR SOLAR-PANELS AND A DEVICE FOR CONNECTING HEADER TO PANEL

[75] Inventor: Aurelio Brollo, Milan, Italy

[73] Assignee: Industrie Pirelli S.p.A., Milan, Italy

[21] Appl. No.: 81,542

[22] Filed: Oct. 3, 1979

[30] Foreign Application Priority Data

Oct. 4, 1978 [IT] Italy ............................... 28393 A/78

[51] Int. Cl.³ ............................................... F16L 47/00
[52] U.S. Cl. ..................................... 285/132; 285/189; 285/252; 285/373; 285/423; 285/DIG. 16; 126/448
[58] Field of Search ............... 285/188, 189, 131, 132, 285/373, DIG. 16, 252, 423; 126/448, 450; 165/158, 168–170, 173, 175; 156/293; 428/83, 122, 192, 358

[56] References Cited

U.S. PATENT DOCUMENTS

| | | | |
|---|---|---|---|
| 1,913,254 | 6/1933 | Predmore | 285/200 |
| 2,262,627 | 11/1941 | Whitesell | 285/419 |
| 3,432,188 | 3/1969 | Turner | 285/373 |
| 3,456,965 | 7/1969 | Gajeeski et al. | 285/419 |
| 4,031,881 | 6/1977 | Thiel | 126/448 |
| 4,070,044 | 1/1978 | Carrow | 285/156 |
| 4,102,726 | 7/1978 | Brackman | 156/293 |
| 4,222,373 | 9/1980 | Davis | 126/450 |

FOREIGN PATENT DOCUMENTS

2719273 11/1977 Fed. Rep. of Germany ...... 126/448
2401390 3/1979 France ............................... 126/448

*Primary Examiner*—David Arola
*Attorney, Agent, or Firm*—Stevens, Davis, Miller & Mosher

[57] ABSTRACT

A header for solar-panels of the type comprising a slab provided with a plurality of parallel through-conduits has a prismatic body. The body is provided with a through-bore that has its axis disposed along the greater dimension of the prismatic body. An aperture made in one side of the prismatic body parallel to the axis of the through-bore is adapted for receiving one end of the slab. A device is provided for attaching the slab to tubular sleeves which project from, in cantilever fashion, the through-bore of the prismatic body.

2 Claims, 5 Drawing Figures

HEADER FOR SOLAR-PANELS AND A DEVICE FOR CONNECTING HEADER TO PANEL

The present invention concerns a header for solar-panels of the type comprising a slab provided with a plurality of through conduits for the passage of fluids that become heated due to the slab being exposed to solar radiation. Herein, by the term "header" is intended those conduits which are placed one at each end of the said slab, for collecting and/or for distributing the fluid inside the through-conduits that are present in the slab itself.

The present invention moreover, concerns a device for connecting the header (according to the present invention) to a solar-panel and more particularly, to a slab of a solar-panel.

Different types of headers for solar-panels are known. These known types, are the cause of considerable drawbacks for the solar-panels into which they are incorporated.

As is known, the problem presented by solar-panels, apart from the obvious one of capturing radiant energy from the sun and transforming it into a portable form of energy with the highest efficiency possible, is to minimize the cost of this source of energy, which depends solely on the cost of the solar-panel itself, so as to allow this source of energy to be competitive or preferred with respect to other sources of energy.

Known solar-panels are not apt for responding satisfactorily to the above-stated problem, since the known headers render the construction and the installation of solar-panels complex and hence, costly.

The aim of the present invention is to provide a header for solar-panels which lowers the construction and installation costs.

Another aim of the present invention, is to have a header for solar-panels which, besides performing the function of a header can also act as a sustaining element for the panel itself.

A further aim of the present invention, is to have a header for solar-panels that allows for an efficient and rapid connection of the solar-panel with other solar-panels without the need of specialized personnel to carry out the work.

Yet another aim of this invention, is to provide a header for solar-panels, which can be attached to the slab provided with through-conduits independently of the structure and the material of the said slab and which also allows if desired, to realize a removable connection between the header and the slab itself.

Forms the object of the present invention a header for solar-panels of the type comprising a slab provided with a plurality of parallel through-conduits said header comprising a prismatic body provided with an open through-cavity that has its axis disposed according to the greater dimension of the prismatic body, an aperture, made at one side of said prismatic body parallel to the axis of the through-cavity and destined to receive one extremity of the slab provided with through-conduits which open into the cavity of the prismatic body and means placed at either end of the prismatic body, for connecting tubular sleaves, in cantilever fashion from said through-cavity of the prismatic body, to said prismatic body.

The present invention will be better understood from the following detailed description, made solely by way of non-limiting example, and with reference to the figures in the attached drawings, wherein.

Figure 1:
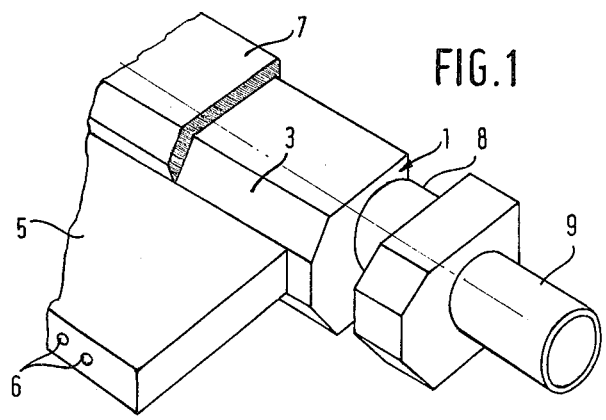
FIG. 1 illustrates a perspective view of a portion (some parts being removed) of a header, according to the present invention, connected to a slab provided with through-conduits.
Figures 2, 3:
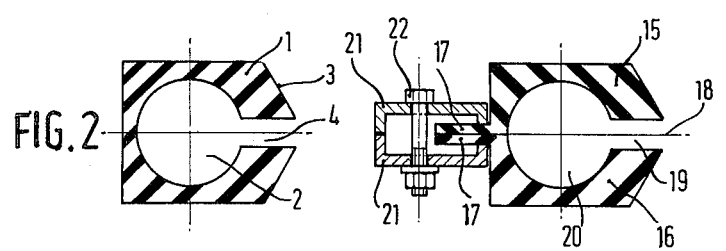
FIG. 2 illustrates a transversal cross-section of an element of the header of FIG. 1.
FIG. 3 illustrates a transversal cross-section of an alternative embodiment of an element of the header according to the present invention.

In FIGS. 1 and 2, is illustrated a header for solar-panels according to the present invention.

As is apparent from these figures, the header comprises a prismatic body 1, made out of elastomeric material and provided with a through-cavity 2, preferably having circular cross section with its axis disposed parallel to the greater dimension of the prismatic body itself.

The prismatic body 1 presents, in correspondence of its face 3, an aperture 4 having its greater dimension parallel to the axis of the through-cavity 2.

In said aperture 4 is fluid-tightly housed the end of slab 5 in which there are present a plurality of through-conduits 6 that open into the said through-cavity 2, by means of a connection (which shall be described further on in this specification).

The prismatic body 1 is surrounded by a metallic rigid profile 7, that allows however, for said prismatic body 1 to remain free at its extremities.

In correspondence of each of the extremities of the prismatic body, is present a groove 8, the bottom of which has a cylindrical surface.

A tubular sleeve 9 is inserted into the through-cavity 2 in such a way as to result disposed in cantilever fashion, i.e. one end of said tubular sleeve penetrates into said through-cavity for a length such that said tubular sleeve results superimposed to the inner surface of the through-cavity 2 underlying the groove 8.

Inside said groove 8 is housed a hose-clamp (not shown in the Figures) which, by its clenching, causes a compression in the elastomeric material of the prismatic body comprised between the hose-clamp and the external surface of the tubular sleeve 9.

In this way, the prismatic body acts also as a sealing gasket for the connection.

As has been previously stated, in the aperture 4 of the prismatic body 1, is housed, by means of a fluid-tight connection, the extremity of the slab 5 that is provided with through-conduits 6.

Said fluid-tight connection between the prismatic body 1 and the extremity of the slab 5 can be realized through a direct vulcanization of the prismatic body (which, in this case, is of an uncured elastomeric material) to the slab 5 (should this also be of an elastomeric material).

In this case, the fluid-tight connection between the above-cited elements is permanent.

On the other hand, should said slab 5 be made of a rigid material (as, for example, of a metallic material), it is possible to realize the fluid-tight connection (between said slab and the header according to the present invention), in such a way as to realize a permanent or a movable connection; if a permanent fluid-tight connection is desired, the extremity of the slab 5 is attached to prismatic body 1 in correspondence of the aperture 4 by means of an adhesive.

In this case, the prismatic body 1 is made of an already vulcanized elastomeric material.

If, on the other hand, a movable fluid-tight connection is desired between the end of slab 5 and the aperture 4 into which it is inserted, of the prismatic body 1 (in this case also made of an already vulcanized material) then, per se known means may be provided such as for example clamps (not illustrated in the figures), that exercise forces on the sides of the metallic profiles 7 that are parallel to each other and also parallel to the sides of the slab 5. These forces push said sides one against the other, thereby producing a considerable pressure, and consequently a considerable friction, between the surfaces of said slab 5 and of aperture 4 of the prismatic body which lie in mutual contact.

As a result of this a movable fluid-tight connection of these elements to each other is obtained.

As stated previously, the connection between the prismatic body 1 and the slab 5 may be obtained by means of vulcanisation if said slab 5 is of an elastomeric material.

Figures 4, 5:
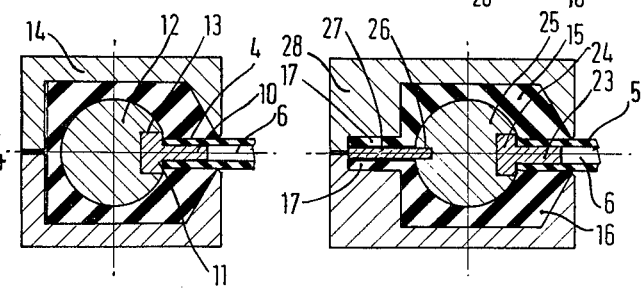
FIGS. 4 and 5 illustrate a section of the devices used for realizing the connection between a header and a solar-panel slab.

For realizing this connection through vulcanization, between the prismatic body 1 and the slab 5, a device or equipment has been foreseen shown in FIG. 4 and described herebelow.

The device in question comprises a plurality of pins 10, that can be inserted into the through-conduits 6 in correspondence of the extremities of the said conduits which are housed within the aperture 4 of the prismatic body 1, and a bar 11, to which the pins are fixed, said bar being housed inside the through-cavity 2.

Moreover, inside the through-cavity 2, is inserted a rigid rod 12 having a groove along one of its own generatrices. Said groove 13 is of such dimension as to receive the bar 11 whereon are fixed the pins 10.

The realization of this fluid-tight connection by vulcanizing the prismatic body 1 to the slab 5 by means of the above-described equipment, takes place as follows:

Firstly, inside the through-conduits 6 of slab 5, are inserted pins 10 present on bar 11.

Next, the extremity of slab 5, is inserted into the aperture 4 of said prismatic body 1 which is made of an uncured elastomeric material.

At this point, into the through-cavity 2 of the prismatic body 1, is inserted rigid rod 12 which is provided with groove 13 for the purpose of housing bar 11 on which there are present the pins 10.

The prismatic body 1 - slab 5 assembly thus formed, is now inserted in a mould 14 formed by two half-moulds that, once joined together, define a prismatic cavity having the form and the outer dimensions of the prismatic body 1.

The mould 14, is then placed between the hot plates of a flat-platen press where, by exercising pressure and furnishing heat, the vulcanization of said prismatic body 1, and its bonding to said slab 5 takes place.

Once the above operation has been terminated, the rigid rod 12 is extracted first from the through-cavity 2 of the prismatic body 1 by sliding said rod out from one extremity of the through-cavity 2.

At this point, the supporting bar 11, bearing the pins 10, is shifted (within the through-cavity 2) away from the aperture 4 of the prismatic body 1 thus bringing about the withdrawal of the pins 10 from the through-conduits 6 of the slab 5. Then said bar (with the pins present on it) is drawn out from the through-cavity 2.

In the case of vulcanized fluid-tight connection between the prismatic body 1 and the end of slab 5, an alternative embodiment for said prismatic body 1 (see FIG. 3) is foreseen.

As can be seen in FIG. 3, the prismatic body is formed by two shaped-elements, 15 and 16, each one of which is provided with a fin 17 disposed in cantilever fashion.

The said cantilevered fins 17 can be joined together by placing them in close contact one with the other along their sides which, when in mutual contact, lie on a plane 18 passing through the mid-plane of an aperture 19 (which is defined by the joining together of the above-said shaped-elements 15 and 16) and through the axis of the prismatic body defined by the union of said shaped-elements.

Through the joining of the said shaped-elements 15 and 16, there is moreover defined a through-cavity 20 - that is identical to the through-cavity 2 of the prismatic body 1 (represented in FIG. 2).

Moreover, the fins 17 are pressed one against the other by a pair of U-shaped profiles 21 that are connected in a removable way, one to the other, and to the said fins 17, by means of bolts 22.

With the alternative embodiment (illustrated in FIG. 3) for the prismatic body, the operation of drawing away the equipment serving for the fluid-tight connection by means of vulcanization, of said prismatic body 1 to the slab 5 is rendered simpler. In particular, the drawing out of the supporting bar which bears the pins inserted into the through-conduits 6 of the slab 5 is facilitated.

The device or equipment employed for the connection of a header according to the alternative embodiment illustrated in FIG. 3, to a slab is shown in FIG. 5.

As can be noted in FIG. 5, this equipment consists of a plurality of pins 23 inserted into the through-conduits 6 of the slab 5 and fixed to a supporting bar 24, that can be housed inside the through-cavity of the terminal, and in particular, in a groove made in a rigid rod 25 destined for filling-up the said through-cavity of the terminal.

Moreover, the rigid rod 25, foresees a groove 26, that is destined for housing part of a plate 27 destined for being interposed between fins 17, so as to keep them apart one from the other except at their lateral extremities.

In particular, the length of the supporting bar 24 for said pins 23, is lesser than the length of the plate 27.

The vulcanized connection of the prismatic body (in the alternative embodiment illustrated in FIG. 3) to the solar-panel slab, takes place as follows:

Firstly, in the through-conduits 6 of the slab are inserted the pins 23 that are present on bar 24, and this is now housed inside the groove that is present in the rigid rod 25 to which plate 27 has already been connected.

At this point, over the rigid rod 26, are disposed the two shaped-elements 15 and 16. The entire assembly is then enclosed in a mould 28 to be placed between the hot plates of a flat-platen press (not shown) for providing heat and pressure to the elastomeric material of the shaped-elements 15 and 16 in order to vulcanize them and to bond them stably to the slab. Also the connection of said shaped-elements 15 and 16 to each other in correspondence of the lateral extremities of the fins 17 takes place.

Once this operation is terminated, the withdrawal of the device from the prismatic body, takes place in the following manner:

Firstly, plate 27 is drawn away by sliding it out from between the two fins 17 that are joined only at their lateral extremities. Then the rigid rod is removed by withdrawing it from one end of the prismatic body and causing it to slide along the axis of the through-cavity of the latter.

Finally the bar 24, bearing pins 23, is removed by extracting it through the space existing between the two fins 17 of the prismatic body.

From the description given above, of the header for solar-panels according to the present invention, it can be easily comprehended how the aims that we propose are obtainable.

As a matter of fact, the structure of the header for solar-panels according to the present invention, consents its utilization for different types of solar-panels. In this way, the header is provided with a considerable versatility.

This fact allows for the possibility of having a great reduction in cost since it obviates the necessity of designing and constructing different types of terminals to suit the diverse types of panels to which they have to be applied.

Moreover, the structure of the header for solar-panels according to this invention permits an extreme simplicity in the fluid-tight joining of various solar panels without the need to call for the services of specialized personnel to carry out the job involved. This point is rendered evident from the fact that the fluid-tight joining of more solar-panels in side by side relationship one to the other, is carried out by simply tightening the hose-clamps concerned over the tubular sleeve inserted inside the through-cavities of two adjacent solar-panels.

Finally, the stiffening element (metallic rigid profile 7) that is foreseen, allows for the header to also act as a sustaining element for the supporting structure of the solar-panel especially in the case when the slab is of an elastomeric material. This is because a transversal stiffening of the panel is obtained and, in any case, the said stiffening element also constitutes an element of anchorage for the panel as well.

Although a particular embodiment of the invention has been illustrated and described, it is to be understood that variations can be made therein by those skilled in the art without departing from the spirit and scope of the invention except as it is limited by the claims.

What is claimed is:

1. A terminal conduit for solar panels comprising:
   a prismatic housing surrounding a cavity which extends longitudinally therethrough, said housing having an elongate aperture therein which communicates with said cavity and has its longer dimension disposed parallel to the longitudinal axis of the housing,
   a slab having a plurality of conduits extending therethrough disposed within one end in the aperature with its through conduits communicating with the said cavity, and
   means for supporting the slab in the aperature and forming a fluid tight seal between the housing surrounding the aperature and the slab, said prismatic body formed by two sections which are joined, one to the other, in correspondence of a plane that passes through the axis of the prismatic body and through the mid-plane of the aperture, and wherein said terminal conduit compries means for joining together the said two sections, said means for joining together the two sections comprising a cantilever fin on the surface of each of the two sections, which, once joined together, form the prismatic body, the said fins each having one face lying on the plane that passes through the axis of the prismatic body and through the mid-plane of the aperture and a pair of sections fitted over said fins pressing the fins together.

2. The terminal conduit for solar-panels as in claim 1 in which a tubular sleeve is positioned in one end of said cavity and extends outwardly therefrom and means for attaching the tubular sleeve to said prismatic body comprising an annular groove on the outer surface of the prismatic body and a hose-clamp adapted to be housed in the annular groove to clamp said prismatic body to said tubular sleeve.

* * * * *